Patented July 10, 1951

2,559,932

UNITED STATES PATENT OFFICE 2,559,932

RUBBER ANTIOXIDANTS

Arthur Stanley Briggs and James Haworth, Blackley, Manchester, England, assignors to Imperial Chemical Industries Limited, a corporation of Great Britain No Drawing. Application February 9, 1948, Serial No. 7,295. In Great Britain February 10, 1947

5 Claims. (Cl. 260—619)

This invention relates to the manufacture and application of new antioxidants.

In British Patent No. 525,737 (1940) there is described a process for the manufacture of vulcanised rubber, which comprises vulcanising rubber hot in a mixture comprising added sulphur, vulcanisation accelerator and a bis-(2-hydroxy-3:5-dimethylphenyl) alkylmethane in which the alkyl radical has not more than 6 carbon atoms. The resulting vulcanized rubber has very good resistance to ordinary ageing and in the case of white or clear coloured vulcanisates, is little if at all stained. The superiority of these antioxidants to other similar antioxidants of the prior art is described in the above patent, which also states that the antioxidants may be made by condensing 2:4-dimethylphenol with the appropriate aliphatic aldehyde in the presence of an acid condensing agent, e. g. hydrochloric or sulphuric acid.

We have now found that mixtures of the said bis - (2 - hydroxy - 3:5 - dimethylphenyl) alkylmethanes with the corresponding bis-(4-hydroxy-2:5-dimethylphenyl) alkylmethanes, which mixtures are obtained by condensing mixtures of 50–80% of 2:4-dimethylphenol and 50–20% of 2:5-dimethylphenol with the appropriate aliphatic aldehyde, not only possess the above-mentioned excellent properties of the antioxidants of British Patent No. 525,737 but have the advantages of being more easily and economically manufactured and of being more readily dispersible in the rubber. The antioxidants also confer valuable antiflexing properties.

Accordingly we regard this invention as affording an important practical advance in the manufacture of non-staining antioxidants.

The mixed antioxidants of our invention are more easily and economically manufactured because, whilst a mixture of 2:4- and 2:5-dimethylphenols free from other phenols is readily isolated from tar acids by fractional distillation, the separation of these two dimethylphenols from each other cannot readily be effected by such physical means as fractional distillation. This is because their boiling points are almost identical, and in fact the only practicable means of separation are chemical methods.

The greater dispersibility of the mixed antioxidants is probably due to their lower melting points, and it permits quicker and easier mixing with the rubber and other ingredients.

As far as we can ascertain, bis-(4-hydroxy-2:5-dimethylphenyl) alkylmethanes are new compounds and so have not been used as rubber antioxidants, and also it is new to use mixed antioxidants of the dihydroxyphenylalkylmethane type.

Preferred mixed antioxidants of our invention are those obtained by using n-butyraldehyde and by using mixtures of 70–75% of 2:4-dimethylphenol and 30–25% of 2:5-dimethylphenol. The mixed antioxidant obtained by condensing n-butyraldehyde with a mixture of 72.5% of 2:4-dimethylphenol and 27.5% of 2:5-dimethylphenol has a melting point of 87–93° C., whereas the individual antioxidants obtained from 2:4- and 2:5-dimethylphenols melt at 123° C. and 171–3° C. respectively.

The following examples in which parts are by weight illustrate but do not limit the invention.

Example 1

488 parts of a mixture of 2:4- and 2:5-dimethylphenols, containing 72.5% by weight of 2:4-dimethylphenol and 27.5% of the other phenol, are heated for 8 hours at 100–105° C. with 160 parts of n-butyraldehyde and 40 parts of 35% hydrochloric acid. Impurities are removed by steam distillation, the residue is dissolved in caustic soda, the solution heated with charcoal, filtered and the mixed antioxidant precipitated with dilute hydrochloric acid, washed and dried. It is a pale cream powder, melting point 87–93° C.

Vulcanisable rubber stocks of the following compositions were prepared by the usual process of mixing, using the above mixed antioxidant.

| Mix | A | B | C |
|---|---|---|---|
| Pale crepe | 100 | 100 | 100 |
| Zinc oxide | 10 | 10 | 10 |
| Blanc fixe | 75 | 75 | 75 |
| Titanium dioxide | 10 | 10 | 10 |
| Stearic acid | 1 | 1 | 1 |
| Diphenylguanidine | 0.5 | 0.5 | 0.5 |
| Sulphur | 3 | 3 | 3 |
| Antioxidant (made as above) | | 1 | |
| αα-bis-(2-hydroxy-3:5-dimethylphenyl)butane, Specification 525,737 | | | 1 |

Sheets of each mix were cured for 60 minutes at 141° C.

Samples of vulcanised sheets of the three mixes were exposed to ultraviolet light for 50 hours and all changed colour to an equal degree, the final colour of each mix being light fawn.

To show the greater dispersibility of the mixed antioxidant over that from 2:4-dimethylphenol and butyraldehyde, the following test was effected.

A quantity of rubber was run on an open roll mill by the technique practised in the art, and to this a quantity of the mixed antioxidant was added. The condensate made as described above readily fluxed and dispersed evenly throughout the mass of the rubber. When this was repeated using identical conditions with the antioxidant from British Patent No. 525,737, viz., αα-bis-(2-hydroxy-3:5-dimethylphenyl)butane, this product did not melt and a longer mixing time was required to give even dispersion throughout the rubber.

To compare the antioxidant properties of the antioxidants of this invention with those of British Patent No. 525,737, vulcanisable rubber stocks were made from mixes D and E, which were made up in the same way as mixes B and C above, but using mercaptobenzthiazole instead of diphenylguanidine and also using 2.5 instead of 3 parts of sulphur, and the mixes then cured for 45 minutes at 141° C.

Ageing tests carried out on these vulcanisates showed the following results:

[Tensile strength (kg./sq. cm.)]

|  | D | E |
|---|---|---|
| Unaged | 142 | 140 |
| Oven at 70° C. (6 weeks) | 88 | 95 |
| Bomb at 70° C. and 300 lb. per sq. in. oxygen pressure (12 days) | 95 | 95 |

These results show the two antioxidants to be substantially the same.

Example 2

In a manner similar to the above, preparations were made from a mixture of 2:4- and 2:5-dimethylphenols containing 72% by weight of 2:4 dimethylphenol and n-propionaldehyde and also from iso-butyraldehyde, to give light fawn coloured products having melting points of 90–100° C. and 94–104° C. respectively.

These products were then incorporated in the following mixes,

| Mix | F | G | H |
|---|---|---|---|
| Pale crepe | 100 | 100 | 100 |
| Zinc oxide | 10 | 10 | 10 |
| Blanc fixe | 75 | 75 | 75 |
| Stearic acid | 1 | 1 | 1 |
| Titanium dioxide | 10 | 10 | 10 |
| Sulphur | 2 | 2 | 2 |
| Zinc diethyldithiocarbamate | 0.25 | 0.25 | 0.25 |
| Product from n-propionaldehyde | | 1 | |
| Product from iso-butyraldehyde | | | 1 |

Sheets of each mix were cured for 30 minutes at 125° C.

Samples of vulcanised sheets of the three mixes were exposed to ultraviolet light for 50 hours and all changed colour to an equal degree, the final colour being light cream.

These mixed antioxidants, when added to rubber on the open mill, fluxed and dispersed evenly throughout the mass of rubber.

To show the antioxidant action of these products, the vulcanised mixes F, G and H were aged for 8 days in an oxygen bomb at 70° C. and 300 lb. per sq. in. pressure, the loss of the tensile strength being determined to assess this antioxidant power, with the following results:

| Mix | F | G | H |
|---|---|---|---|
| Tensile strength, unaged | 182 | 179 | 189 |
| Tensile strength after 8 days | perished | 20 | 32 |

Thus both products are efficient antioxidants which cause no staining of the vulcanisate.

We claim:

1. A rubber antioxidant comprising a mixture of bis-(2-hydroxy-3:5-dimethylphenyl) alkylmethane in which the alkyl radical has not more than 6 carbon atoms and the corresponding bis-(4-hydroxy-2:5-dimethylphenyl) alkylmethane, said mixture being obtained by condensing in the presence of an acid condensing agent a mixture of 50–80% of 2:4-dimethylphenol and 50–20% of 2:5-dimethylphenol with an aliphatic aldehyde containing not more than 7 carbon atoms.

2. A rubber antioxidant as claimed in claim 1 wherein the said mixture of dimethylphenols is a mixture of 70–75% of 2:4-dimethylphenol and 30–25% of 2:5-dimethylphenol.

3. A rubber antioxidant as claimed in claim 1 wherein the said aliphatic aldehyde is n-butyraldehyde.

4. A process for the manufacture of vulcanized rubber which comprises the incorporation therein of the antioxidant of claim 1.

5. A process for producing a rubber antioxidant which comprises a mixture of bis-(2-hydroxy-3:5-dimethylphenyl) alkylmethane in which the alkyl radical has not more than 6 carbon atoms and the corresponding bis-(4-hydroxy-2:5-dimethylphenyl) alkylmethane, said process comprising the steps of condensing in the presence of an acid condensing agent a mixture comprising 50–80% of 2:4-dimethylphenol and 50–20% of 2:5-dimethylphenol with an aliphatic aldehyde containing not more than 7 carbon atoms.

ARTHUR STANLEY BRIGGS.
JAMES HAWORTH.

REFERENCES CITED

The following references are of record in the file of this patent:

UNITED STATES PATENTS

| Number | Name | Date |
|---|---|---|
| 1,614,171 | Ammann et al. | Jan. 11, 1927 |
| 1,989,788 | Calcott et al. | Feb. 5, 1935 |
| 2,111,769 | Graves | Mar. 22, 1938 |
| 2,285,259 | Downing et al. | June 2, 1942 |
| 2,456,582 | Cislak | Dec. 14, 1948 |

FOREIGN PATENTS

| Number | Country | Date |
|---|---|---|
| 525,737 | Great Britain | Sept. 3, 1940 |